Jan. 14, 1930.  U. MEYER  1,743,790
METHOD FOR REPAIRING PUPINIZED SUBMARINE CABLES
Filed Nov. 17, 1925
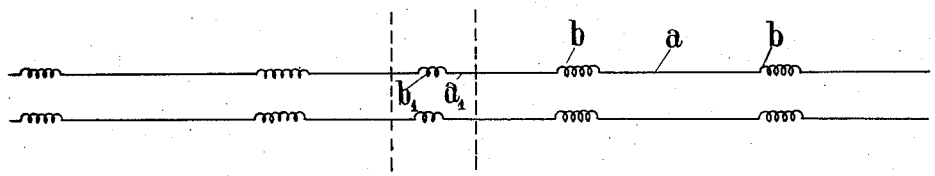
INVENTOR
U. MEYER
BY
*[signature]*
ATTORNEY Patented Jan. 14, 1930

1,743,790

UNITED STATES PATENT OFFICE

ULFILAS MEYER, OF COLOGNE-MULHEIM, GERMANY

METHOD FOR REPAIRING PUPINIZED SUBMARINE CABLES

Application filed November 17, 1925, Serial No. 69,698, and in Germany November 18, 1924.

When repairing submarine cables it is in the most cases impossible to leave the length of the cable unchanged. At the defective spot the cable has commonly not as much slack as to allow it to be raised without separation. In such cases it is cut through by means of cutting grapnels on the bottom of the sea and the ends are raised individually. At the surface of the sea between the two ends of the cable is then a distance which in the case of deep-sea can amount to kilometers. Even by drifting off of the cable ship during repairing such distance can be caused. Therefrom results the necessity to splice besides the defective cable piece an additional cable length for the connection of the ends. For pupinized cables difficulties are arising herefrom. If only an additional cable length would be inserted the distance between the coils near the cable ends would be enlarged very much and this would be a great drawback for the attenuation and the limiting frequency of the cable. In order to retain the symmetry of the cable and to avoid these drawbacks the inserted cable length would have to be made a multiple of the distance between the coils and be provided with the corresponding numbers of coils. This means if used would cause other undesirable consequences. In order to attain always the full coil distance the inserted cable length must be made longer than necessary on account of other circumstances. The repair would become very expensive by the waste of cable length and the whole cable would become longer than necessary, which would grow considerable with repeated repairs. Moreover the slacks of the cable unavoidable to a certain degree cause tangles on the bottom of the sea which render more difficult the raising for future repairs. It is undesirable to increase this danger of entangling by paying out superfluous cable lengths.

The object of the present invention is to avoid these drawbacks. A close investigation of the conditions has shown that it is not necessary to equalize the construction of the cable exactly in all its parts but that the chief thing is only to equalize the wave resistance for each coil field the length of which may therefore differ from the normal coil distance. By a coil field I understand the piece of cable between two coils, including the coil pertaining thereto. The wave resistance of a pupinized line is nearly equal to the root of the proportion of the total induction to the capacity. According to the present invention when repairing pupinized submarine cables the inserted cable piece must be given a length which is independent of the normal distance of the coils and which results from the local conditions. This cable piece is provided with Pupin-coils the total self-induction of which is to the self-induction of the normal coil of the cable as the length of the inserted cable piece is to the normal distance of the coils. Naturally the normal coil size must not be exceeded and in the case of greater lengths a subdivision must take place. Take as example a submarine cable as shown on the accompanying drawing which is provided with coils $b$ of 0.3 henrys at distances $a$ of 5 kilometers, and in which in the case of a repair a cable piece $a_1$ of 2 kilometers must be inserted. At the same time a coil $b_1$ of 0.12 henrys would have to be inserted.

It must be pointed out that the mentioned conditions need not be fulfilled exactly. Even if the adjustment is approximate advantages will be obtained as well for the amount of the wave resistance as for the amount of the limit frequency.

The drawing shows a twin-core cable but the invention can be applied in the same manner to single-core cables.

What I claim as my invention and desire to secure by Letters Patent is:

1. An insertion for the damaged place of a pupinized submarines cable comprising a piece of cable, the length of which is different from but not an integer multiple of the normal distance between the coils of the pupinized cable, and self-inductance coils inserted in the said piece of cable which are so dimensioned that the wave resistance of the insertion corresponds to the wave resistance of the cable.

2. An insertion for the damaged place of a pupinized submarine cable comprising a piece of cable, the length of which is different from but not an integer multiple of the normal distance between the coils of the pupinized cable, and self-inductance coils inserted in the said piece of cable which are so dimensioned that the wave resistance of the insertion corresponds to the wave resistance of the cable and that their self-inductance is to the self-inductance of the normal coil of the pupinized cable as the length of the said piece of cable is to the normal distance between the coils.

In testimony whereof I have affixed my signature.

ULFILAS MEYER.